United States Patent [19]
Kang et al.

[11] Patent Number: 5,543,933
[45] Date of Patent: Aug. 6, 1996

[54] RESERVE-RECORDING METHOD AND APPARATUS FOR VCR

[75] Inventors: Yong S. Kang, Kyungki; Yong K. Oh, Seoul; Se I. Cha; Chul S. Lee, both of Kyungki-do, all of Rep. of Korea

[73] Assignee: Gold Star C., Ltd., Seoul, Rep. of Korea

[21] Appl. No.: 391,626

[22] Filed: Feb. 21, 1995

Related U.S. Application Data

[63] Continuation of Ser. No. 780,118, Oct. 21, 1991, abandoned.

[30] Foreign Application Priority Data

Oct. 20, 1990 [KR] Rep. of Korea ............... 16778/1990
Oct. 20, 1990 [KR] Rep. of Korea ............... 16782/1990
Dec. 28, 1990 [KR] Rep. of Korea ............... 22165/1990
Dec. 28, 1990 [KR] Rep. of Korea ............... 22314/1990

[51] Int. Cl.⁶ ............... H04N 5/76; H04N 5/78
[52] U.S. Cl. ............ 358/335; 348/906; 360/10.1
[58] Field of Search ............... 358/335, 310, 358/342; 455/171, 181, 186; 360/33.1, 32; 348/734, 241, 906

[56] References Cited

U.S. PATENT DOCUMENTS

| | | | |
|---|---|---|---|
| 4,280,159 | 7/1981 | Nakayama | 360/137 |
| 4,706,121 | 11/1987 | Young | 358/142 |
| 4,796,107 | 1/1989 | Hiraki | 360/33.1 |
| 5,166,911 | 11/1992 | Misawa et al. | 368/10 |
| 5,187,589 | 2/1993 | Kono et al. | 358/335 |

FOREIGN PATENT DOCUMENTS 2005070  6/1990  Canada.

*Primary Examiner*—Thai Q. Tran
*Assistant Examiner*—Robert Chevalier
*Attorney, Agent, or Firm*—Fish & Richardson P.C.

[57] ABSTRACT

A reserve-recording method and apparatus for a VCR are described which generate a voice signal to inform the user of information required to set and perform the reserve-recording. The apparatus includes a recording switching circuit to form a recording line between the apparatus and one of a plurality of external input devices, including a tuner for receiving a television broadcast. The reserve-recording method informs the user by voice and screen of information required to set a reserve-recording program, sets a reserve-recording mode, sorts the reserve-recording programs in their reserve numbers in order of the recording start time, and discriminates the reserve recording mode. A method of sorting reserve-recording programs according to recording start time is also provided.

4 Claims, 14 Drawing Sheets

FIG. 3A
(Prior Art)
| PROGRAM NO. | START | END | LENGTH | SPEED |
|---|---|---|---|---|
| 1 | 19TH DAY 10:00 | 19TH DAY 13:00 | 3 HOURS | SSM |
| 2 | 20TH DAY 10:00 | 20TH DAY 16:00 | 6 HOURS | ESM |
| 3 | 21TH DAY 10:00 | 21TH DAY 12:00 | 9 HOURS | ESM |
| | | | | |
FIG. 3B
(Prior Art)
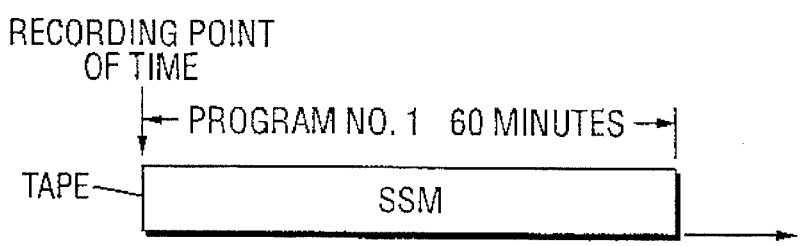
FIG. 3C
(Prior Art)
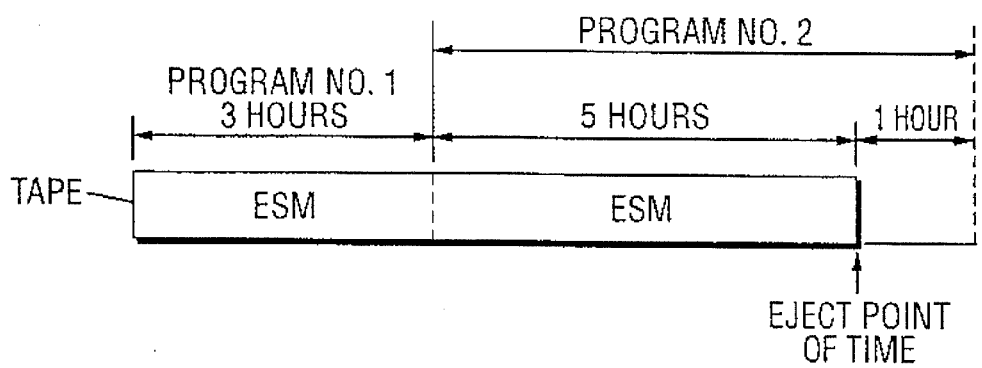

FIG. 12A
| PROGRAM NO. | START | END | SPEED | TOTAL |
|---|---|---|---|---|
| 1 | 19TH DAY 10:00 | 19TH DAY 11:00 | SSM | 1 |
| 2 | 20TH DAY 10:00 | 20TH DAY 13:00 | ESM | 4 |
| 3 | 21TH DAY 10:00 | 21TH DAY 10:40 | SSM | 4:40 |
| ⋮ | ⋮ | ⋮ | ⋮ | ⋮ |
| ⋮ | ⋮ | ⋮ | ⋮ | ⋮ |
FIG. 12B
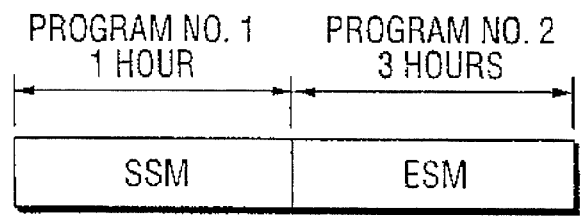
FIG. 12C
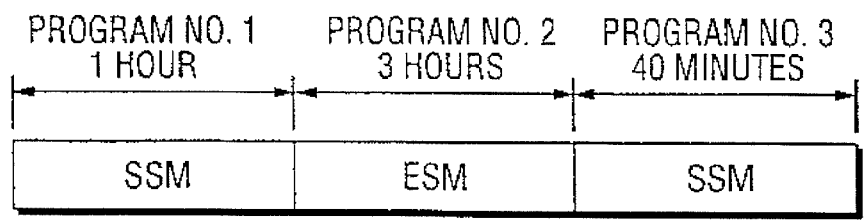

RESERVE-RECORDING METHOD AND APPARATUS FOR VCR

BACKGROUND OF THE INVENTION

This application is a file wrapper continuation of U.S. application Ser. No. 07/780,118, filed Oct. 21, 1991, now abandoned.

1. Field of the Invention

The present invention relates to reserve-recording method and apparatus for a video cassette recorder (VCR).

2. Description of the Prior Art

An embodiment of a conventional reserve-recording apparatus for a video cassette recorder (VCR) will be described with reference to FIGS. 1 through 3.

First, a construction of the conventional reserve-recording apparatus for the VCR will be described with reference to FIG. 1.

With reference to FIG. 1, there is shown a block diagram of the conventional reserve-recording apparatus for the VCR. The illustrated apparatus comprises a key matrix unit 1 for outputting a key signal S1 in response to a selection of the user, a remote key signal receiving unit 3 for receiving a remote key signal outputted from a remote controller 2 and outputting a desired key signal S2 corresponding to the received remote key signal, an on-screen display unit 5 for displaying an operation mode state of the VCR through a television set or a monitor 4 in response to an external control signal S4, a time display unit 6 for displaying time information according to an operation of the VCR in response to an external control signal S3, a servo system 7 for outputting a control signal S7 to control traveling of a VCR tape in response to an external control signal S5, a tape loading control unit 8 for outputting a control signal S8 to control loading, unloading and ejecting of the VCR tape in response to an external control signal S6, a deck unit 9 for performing the traveling and loading of the VCR tape in response to the control signals S7 and S8 from the servo system 7 and the tape loading control unit 8 and outputting a supply state signal S9, a take-up state signal S10 and a loading state signal S11 with respect to the VCR tape, system control means 10 for receiving the supply state signal S9, the take-up state signal S10 and the loading state signal S11 from the deck unit 9 and an external control signal S12 and outputting the external control signals S5 and S6 respectively to the servo system 7 and the tape loading control unit 8 and a display control signal S13, and timer functioning control means 11 for receiving the supply state signal S9, the take-up state signal S10 and the loading state signal S11 from the deck unit 9 and the display control signal S13 from the system control means 10 and outputting the external control signals S3 and S4 respectively to the time display unit 6 and the on-screen display unit 5. Also, the timer functioning control means 11 receives the key signals S1 and S2 from the key matrix unit 1 and the remote key signal receiving unit 3 and outputs the external control signals S3, S4 and S12 respectively to the time display unit 6, the on-screen display unit 5 and the system control means 10.

The deck unit 9 includes a supply reel sensor (not shown) for sensing a state of a supply reel with respect to the VCR tape to output the supply state signal S9, a take-up reel sensor (not shown) for sensing a state of a take-up reel with respect to the VCR tape to output the take-up state signal S10, and a sensor (not shown) for sensing whether the VCR tape has been loaded to output the loading state signal S11.

Now, the operation of the conventional reserve-recording apparatus with the above-mentioned construction will be described with reference to FIGS. 2 and 3.

With reference to FIG. 2, there is shown a flowchart illustrating the overall operation of the conventional reserve-recording apparatus shown in FIG. 1.

First, upon powering the VCR, a main routine begins to be performed. At this time, the VCR checks whether the key signal S1 or S2 from the key matrix unit 1 or the remote key signal receiving unit 3 corresponds to a reserve-recording setting mode. If the key signal S1 or S2 from the key matrix unit 1 or the remote key signal receiving unit 3 corresponds to the reserve-recording setting mode, a reserved program setting routine is performed and it is then checked whether the current time is in accord with the recording time of a pre-reserved program. Namely, a data format corresponding to the corresponding reserve-recording program, such as a table as shown in FIG. 3a, is stored in a predetermined memory (not shown) typically included in the timer functioning control means 11, in accordance with the key signal S1 or S2, and it is then checked whether the current time is in accord with the recording time of the pre-reserved program.

On the other hand, unless the key signal S1 or S2 from the key matrix unit 1 or the remote key signal receiving unit 3 corresponds to the reserve-recording setting mode, it is directly checked whether the current time is in accord with the recording time of the pre-reserved program.

At this time, the timer functioning control means 11 outputs the control signal S4 to the on-screen display unit 5 so that the on-screen display unit 5 displays the contents as shown in FIG. 3a corresponding to the key signals S1 and S2 through the television set or monitor 4. As a result, the user can confirm those contents through the television set or monitor 4.

Thereafter, if the current time is in accord with the recording time of the pre-reserved program, the timer functioning control means 11 outputs the external control signal S12 to the system control means 10 so that the system control means 10 performs the reserve-recording of the pre-reserved program.

On the other hand, unless the current time is in accord with the recording time of the pre-reserved program, the operation is returned to the initial state. At this time, the system control means 10 checks whether the VCR tape has been loaded. If the VCR tape has been loaded, the reserve-recording operation is performed; if not so, the operation is returned to the initial state. The system control means 10 then checks the remaining quantity of the VCR tape in the course of performing of the reserve-recording of the reserved program. If the VCR tape is fully used and the end portion of the VCR tape is thus detected, the reserve-recording operation of the reserved program is stopped, the VCR tape is ejected and the operation is then returned to the initial state.

On the other hand, if the end portion of the VCR tape is not detected in the course of performing of the reserve-recording of the reserved program, the reserve-recording operation is performed during a predetermined reserve-recording period of time, the VCR tape is ejected and the operation is then returned to the initial state.

The system control means 10 and the timer functioning control means 11 perceive the loading state and traveling state (i.e., a traveled position, start and end) of the VCR tape in accordance with the supply state signal S9, the take-up state signal S10 and the loading state signal S11 from the sensors in the deck unit 9 which operates in response to the control signals S7 and S8 from the servo system 7 and the tape loading control unit 8. In other words, the timer functioning control means 11 perceives the traveling state of the VCR tape in accordance with pulses outputted from the reel sensors and then outputs the external control signal S3 corresponding to the traveling state of the VCR tape to the time display unit 6 so that the time display unit 6 displays the traveling state of the VCR tape, thereby allowing the user to confirm the traveling state of the VCR tape. Also, the timer functioning control means 11 outputs the external control signal S4 corresponding to the key signal S1 or S2 from the key matrix unit 1 or the remote key signal receiving unit 3 to the on-screen display unit 5 so that the on-screen display unit 5 displays playback modes of the VCR, such as play mode, rewind mode and fast-forward mode.

The deck unit 9 performs the loading/unloading of the VCR tape into/from the VCR and the ejecting of the VCR tape from the VCR under the control of the tape loading control unit 8. Also, the deck unit 9 performs the traveling of the VCR tape in various modes under the control of capstan and drum motors (not shown), in which the speed and the phase are controlled by the system control means 10.

However, the conventional reserve-recording apparatus for the VCR has disadvantages as follows:

First, supposing that the reserve-recording time is set as that of the first reserved program as shown in FIG. 3*a* and two hours and forty minutes VCR tape has been loaded into the deck unit 9, the first reserved program is not recorded by about twenty minutes when the reserve-recording is performed in a standard speed mode (SSM) as shown FIG. 3*b*. Also, supposing that the reserve-recording times are set as those of the first and second reserved programs as shown in FIG. 3*a* and two hours and forty minutes VCR tape has been loaded into the deck unit 9, the second reserved program is not recorded by about one hour even when the reserve-recording is performed in an extended speed mode (ESM) as shown FIG. 3*c*. In addition, when the reserve-recording operation of the first reserved program is changed from the preselected standard speed mode to the extended speed mode, a degradation in the picture quality is caused.

Second, as shown in FIG. 4, which illustrates a subroutine for setting a reserved program, if the user operates the key matrix unit 1, the VCR checks whether the inputted key signal corresponds to a reserve setting mode. If the inputted key signal corresponds to the reserve setting mode, the VCR perceives in sequence a number, a year, a month, a day, start and end times of the reserved program and then stores those into a predetermined memory in the timer functioning control means 11. However, since there is not present a correlation between the number of the reserved program and the start time of the reserved program, the user cannot readily confirm the start time of the reserved program and the reservation of the recording of the program and the execution of the reserve-recording of the reserved program are wanting in consistency. That is, the recording start time of the low-numbered reserved program becomes later than that of the high-numbered reserved program and, on the contrary, the recording start time of the high-numbered reserved program becomes earlier than that of the low-numbered reserved program.

Third, according to the construction of the conventional reserve-recording apparatus for the VCR, the timer functioning control means 11 checks whether the current time is in accord with the reserve-recording time of the reserved program. If the current time is in accord with the reserve-recording time of the reserved program, the timer functioning control means checks whether the reserve-recording apparatus has been connected with a tuner (not shown) contained in the VCR for reception of a television broadcasting program. If the reserve-recording apparatus has been connected with the tuner, the corresponding program on the corresponding channel is recorded. If not so, the reserve-recording apparatus is forced to be connected to the tuner and the reserve-recording of the reserved program is then performed. As stated, the conventional reserve-recording apparatus for the VCR reserve-records only the television broadcasting program depending on the tuner contained in the VCR, while cannot automatically reserve-record programs from external equipments such as a satellite broadcasting receiver or a camcorder. As a result, for the purpose of the reserve-recording of the programs from the external equipments, the user must memorize the recording time of the programs from the external equipments. In other words, the reserve-recording of the programs from the external equipments is manually performed if the current time is in accord with the recording time while the user memorizes the recording time of the programs from the external equipments.

Fourth, in the conventional reserve-recording apparatus for the VCR, the user sets the reserve-recording time of the desired program and then selects "PROGRAM REVIEW" in an on-screen display (OSD) mode by means of the key matrix unit 1 or the remote controller 2 to confirm the reserve-recording time of the set program. Also, the reserve-recording of the reserved program can automatically be performed only on the powering-off of the VCR. For this reason, in a case where the user watches television, with forgetting the reserve-recording time of the reserved program, under the condition that reserve-recording time of the reserved program is set, or in another case where the user goes out during the powering-on of the VCR under the condition that the reserve-recording time of the reserved program is set, the reserve-recording of the program reserved at this time is released. Also, an outsider sometimes watches the VCR or television with having no regard for the reserve-recording time of the reserved program. For this reason, the reserve-recording of the desired program is difficult to perform readily.

SUMMARY OF THE INVENTION

Therefore, the present invention has been made in view of the above problems, and it is an object of the present invention to provide reserve-recording method and apparatus for a VCR, which are capable of transferring information according to the remaining time of a VCR tape loaded into the VCR to the user by means of a voice and a screen when the user sets the reserve-recording time of a desired program, so that the total of the reserve-recording time of the desired program to be reserved and the reserve-recording times of the pre-reserved programs cannot exceed the remaining time of the VCR tape.

It is another object of the present invention to provide reserve-recording method and apparatus for a VCR, which are capable of comparing the recording start time of a current reserved program with the recording start times of pre-reserved programs, sorting the reserved programs in accordance with the compared result so that the reserved program with the earlier recording start time goes first in a recording order and storing the sorted result into a predetermined memory in the VCR, so that the user can obviously confirm the recording start times of respective reserved programs and the reserve-recording can consistently be performed in the VCR.

It is still another object of the present invention to provide reserve-recording method and apparatus for a VCR, which are capable of automatically reserve-recording, in accordance with selection of the user, programs from external equipments such as a satellite broadcasting receiving system, a camcorder and etc., being connected to the VCR, in addition to a television broadcasting program.

It is yet another object of the present invention to provide reserve-recording method and apparatus for a VCR, which is capable of continuously checking the recording start time of a set reserved program and displaying the recording start and end times of the set reserved program on the screen when the current time reaches a predetermined time before the recording start time of the set reserved program in accordance with the checked result, so that the user can accurately reserve-recording the desired program in time.

In accordance with one aspect of the present invention, there is provided a method of reserve-recording a program in a VCR, comprising the steps of: (a) informing of the current recordable remaining state of a VCR tape by a voice and a screen if a reserve-recording program setting mode is designated by an inputted first key signal; (b) setting reservation of recording of a desired program in accordance with an inputted second key signal; (c) setting a reserve-recording mode of determining in accordance with an inputted third key signal whether a source of the set reserve-recording program is which one of a television set or other external equipments; (d) comparing the recording start time of the current reserved program with the recording start times of pre-reserved programs, and sorting the reserve-recording programs in their reserve numbers in order of earliness in accordance with the compared result so that the reserve-recording program with the earlier recording start time goes first in a recording order; (e) displaying reserve information of the set reserve-recording program through the screen when the current time reaches a predetermined time before the recording start time of the set reserve-recording program; (f) discriminating the set reserve-recording mode and forming a recording line between a system and the equipment corresponding to the discriminated reserve-recording mode; and (g) performing the recording of the set reserve-recording program during the reserved time when the current time reaches the recording start time of the set reserve-recording program.

In accordance with another aspect of the present invention, there is provided a reserve-recording apparatus for a VCR, comprising: control means for providing a plurality of control signals necessary to respective components in the apparatus in accordance with a plurality of key signals inputted therein; key signal input means for providing said control means with said plurality of key signals corresponding to commands by selection of the user; on-screen display means for displaying reserve-recording information through the screen under a control of said control means; time display means for displaying a traveling state of a VCR tape under a control of said control means; voice generating means for outputting a voice message corresponding to the reserve-recording information under a control of said control means; VCR tape state detecting means for detecting the traveling state of said VCR tape and providing said control means with a plurality of signals in accordance with the detected state; recording switching means for forming a recording line between the apparatus and one of a plurality of external equipments including a tuner for receiving a television broadcasting, under a control of said control means; and recording means for recording an output signal from said recording switching means on said VCR tape.

In accordance with still another aspect of the present invention, there is provided a method of displaying a recordable state of a program in a VCR in order to reserve-record the program in the VCR, comprising the steps of: (a) informing of an on-screen menu for function selection by a voice and a screen if the current mode is not an on-screen display mode and a key signal for on-screen display has been inputted, and then returning the operation to the initial state; (b) comparing the recordable remaining time of a VCR tape with recording times of pre-reserved recording programs if the current mode is not said on-screen display mode and no key signal for on-screen display has been inputted, informing of reserve-recording information corresponding to the compared result by the voice and the screen and then returning the operation to the initial state; (c) erasing a character displayed on the screen if the current mode is said on-screen display mode and a key signal for stopping the on-screen display has been inputted, and then returning the operation to the initial state; (d) comparing the total of the recording times of the current reserved recording program and the pre-reserved recording programs with the recordable remaining time of said VCR tape if a key signal for setting the reserve-recording program has been inputted under the condition that the current mode is said on-screen display mode and no key signal for stopping the on-screen display has been inputted, informing of reserve-recording information corresponding to the compared result by the voice and the screen, performing another function in said on-screen display mode, and then returning the operation to the initial state; and (e) performing directly another function in said on-screen display mode if no key signal for setting the reserve-recording program has been inputted under the condition that the current mode is said on-screen display mode and no key signal for stopping the on-screen display has been inputted, and then returning the operation to the initial state.

In accordance with still a further aspect of the present invention, there is provided a method of sorting reserve-recording programs in a VCR in order to reserve-record them in the VCR in order of the recording start time, comprising the steps of: (a) designating the reserve-recording programs with numbers, respectively, such that one having earlier recording starting time has an earlier number; (b) if the earliest one of reserve-recording programs has been reserve-recorded, newly designating remaining reserve-recording programs with new numbers each being later, by one, than its previous number; (c) if the current mode is a reserve-recording program setting mode for a new reserve-recording program under the condition that no reserve-recording program has been reserve-recorded, discriminating whether any reserve-recording number which can be designated for the new reserve-recording program has remained in the previously reserved recording programs; (d) if a reserve-recording number which can be designated for a new reserve-recording program has remained, comparing repeatedly the start time of the new reserve-recording program with those of the pre-reserved recording programs one by one in the order of recording start time until the start time of the new reserve-recording program is earlier than that of one of the pre-reserved recording programs, then designating the new reserve-recording program with the number of said one pre-reserved recording program, and newly designating the one pre-reserved recording program and its following pre-reserved recording programs with new numbers each being later, by one, than its previous number;

and (e) if it is discriminated at said step (c) that there is no reserve-recording number which can be designated for the new reserve-recording program, releasing the reserve-recording program setting mode for the new reserve-recording program and then performing previous operations.

In accordance with yet another aspect of the present invention, there is provided a method of displaying reserve information of a program in a VCR in order to reserve-record the program in the VCR, comprising the steps of: (a) informing of set reserve information of the recording program by a voice and a screen when the current time reaches a predetermined time before the recording start time of the reserved recording program during powering-on of the VCR, and then powering off the VCR; (b) performing the recording of the reserve-recording program in accordance with reserved contents when the current time is in accord with the recording start time, under the condition that the VCR is being powered off and a VCR tape has been loaded at the predetermined time before the recording start time of the reserve-recording program; and (c) releasing the reserved state of the reserve-recording program when the current time is in accord with the recording start time, under the condition that the VCR is being powered off and no VCR tape has been loaded at the predetermined time before the recording start time of the reserve-recording program.

BRIEF DESCRIPTION OF THE DRAWINGS

The above and other objects, features and advantages of the present invention will be more clearly understood from the following detailed description taken in conjunction with the accompanying drawings, in which:

FIGS. 3a through 3c illustrate setting states of reserve-recording programs in the conventional reserve-recording apparatus shown in FIG. 1;

FIGS. 12a through 12c illustrate setting states of reserve-recording programs in the reserve-recording apparatus shown in FIG. 5 in accordance with the present invention;

DETAILED DESCRIPTION OF PREFERRED EMBODIMENTS

First, a construction of a reserve-recording apparatus for a VCR in accordance with the present invention will be described with reference to FIG. 5.

Figure 1:
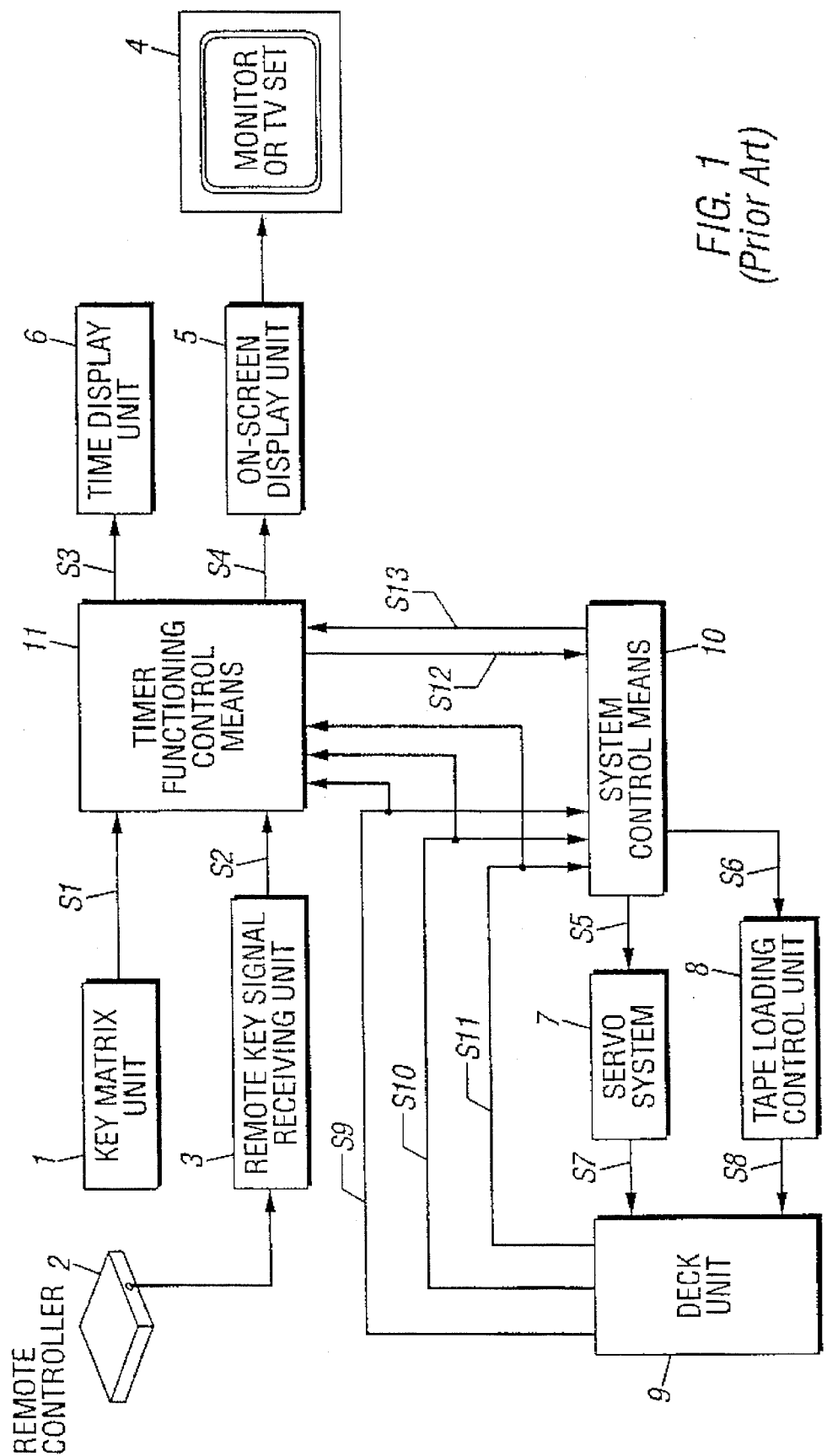
FIG. 1 is a block diagram of a conventional reserve-recording apparatus for a VCR.
Figure 2:
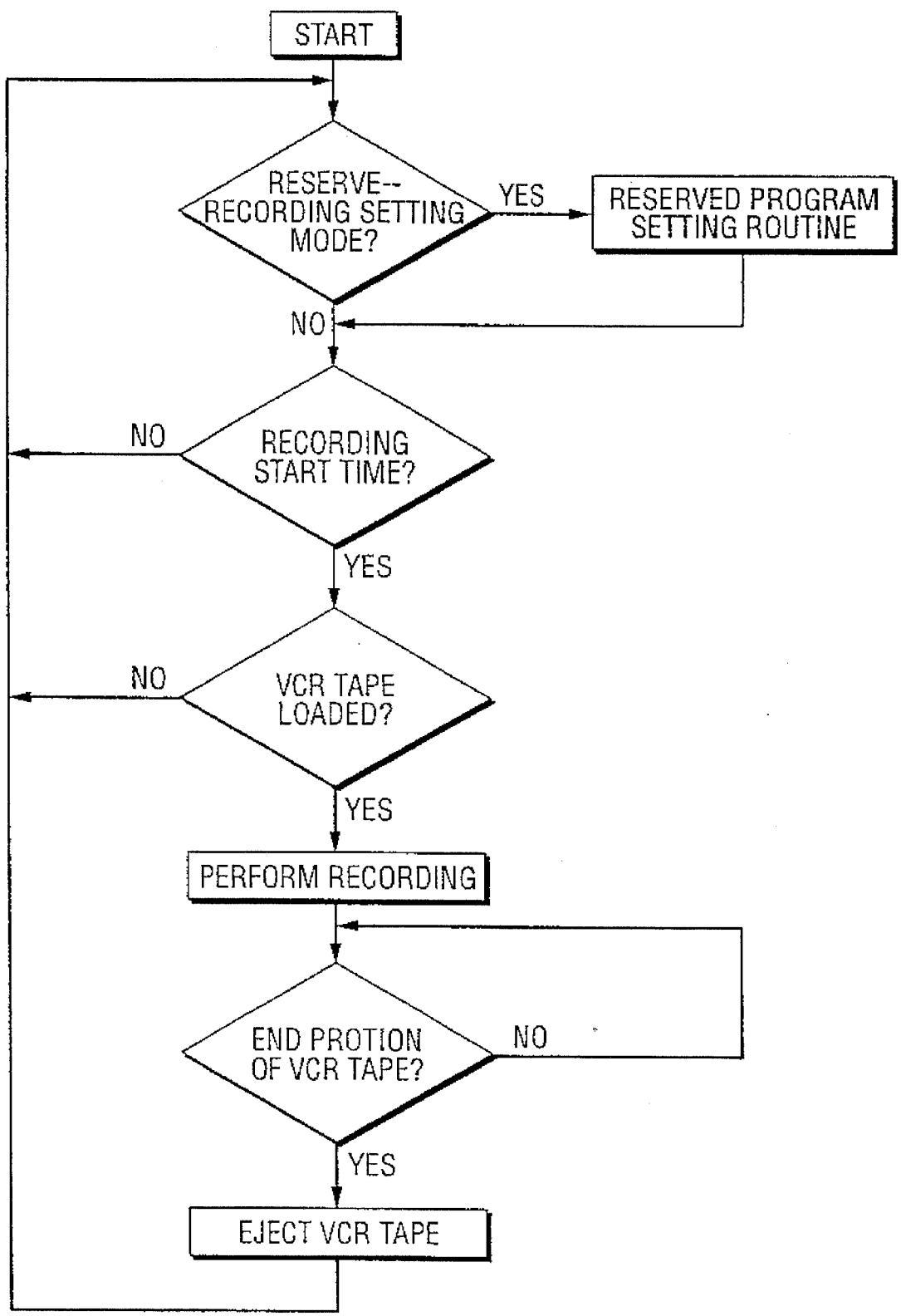
FIG. 2 is a flowchart illustrating the overall operation of the conventional reserve-recording apparatus shown in FIG. 1.
Figure 4:
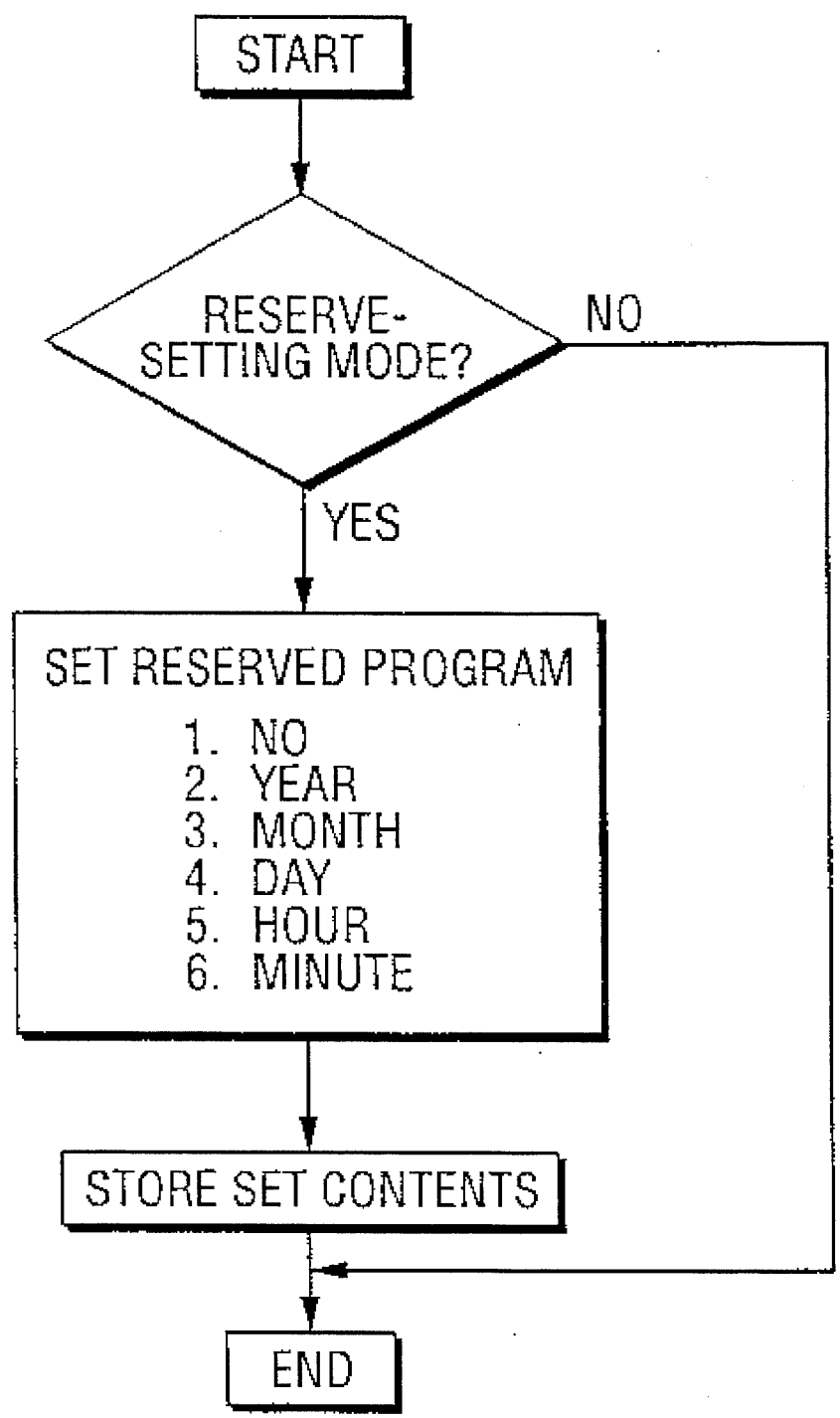
FIG. 4 is a flowchart illustrating a process of setting the reserve-recording program in the conventional reserve-recording apparatus shown in FIG. 1.
Figure 5:
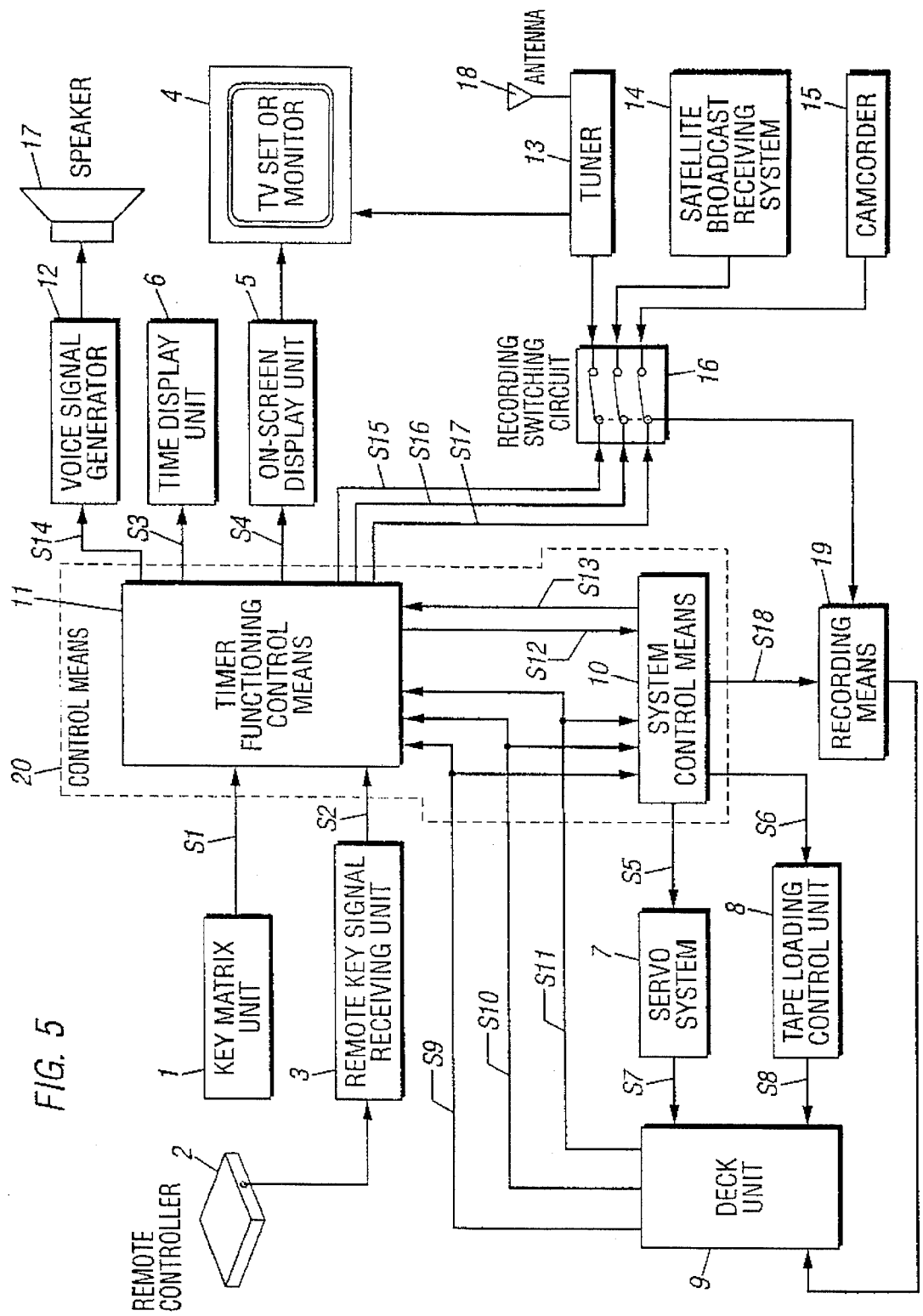
FIG. 5 is a block diagram of a reserve-recording apparatus for a VCR in accordance with the present invention.

With reference to FIG. 5, there is shown a block diagram of the reserve-recording apparatus for the VCR in accordance with the present invention. As shown in this drawing, the reserve-recording apparatus for the VCR in accordance with the present invention comprises a key matrix unit 1 installed on an external panel of the VCR for outputting a key signal S1 in response to a selection of the user, a remote controller 2 for providing a command signal to the VCR at a long distance, a remote key signal receiving unit 3 for receiving an output signal from the remote controller 2 and outputting a desired key signal S2 corresponding to the received remote key signal, a television set or monitor 4 being connected to the VCR, an on-screen display unit 5 for displaying an operation mode state of the VCR through the television set or monitor 4 in response to an external control signal S4, a time display unit 6 for displaying time information according to an operation of the VCR in response to an external control signal S3, a servo system 7 for outputting a control signal S7 to control traveling of a VCR tape in response to an external control signal S5, a tape loading control unit 8 for outputting a control signal S8 to control loading, unloading and ejecting of the VCR tape in response to an external control signal S6, and a deck unit 9 for performing the traveling and loading of the VCR tape in response to the control signals S7 and S8 from the servo system 7 and the tape loading control unit 8 and outputting a supply state signal S9, a take-up state signal S10 and a loading state signal S11 with respect to the VCR tape.

The deck unit 9 includes a supply reel sensor (not shown) for sensing a state of a supply reel with respect to the VCR tape to output the supply state signal S9, a take-up reel sensor (not shown) for sensing a state of a take-up reel with respect to the VCR tape to output the take-up state signal S10, and a sensor (not shown) for sensing whether the VCR tape has been loaded to output the loading state signal S11.

Also, the reserve-recording apparatus for the VCR in accordance with the present invention comprises control means 20 for providing a plurality of control signals necessary to respective components in the apparatus in response to output signals from the key matrix unit 1 or the remote controller 2 and the deck unit 9, a voice signal generator 12 for outputting a voice message corresponding to performing of the reserve-recording of the reserved program through a speaker 17 in response to a control signal S14 from the control means 20, a tuner 13 for receiving a television broadcasting signal through an antenna 18, a satellite broadcasting receiving system 14 for receiving a satellite broadcasting, a camcorder (or another VCR) 15, a recording switching circuit 16 for outputting one of output signals from the tuner 13, the satellite broadcasting receiving system 14 and the camcorder 15 in response to control signals S15, S16 and S17 from the control means 20, and recording means 19 for recording an output signal from the recording switching circuit 16 on the VCR tape loaded into the deck unit 9 in response to a control signal S18 from the control means 20.

The control means 20 is provided with system control means 10 and timer functioning control means 11.

The system control means 10 receives the supply state signal S9, the take-up state signal S10 and the loading state signal S11 from the deck unit 9 and an external control signal S12 from the system control means 10 corresponding to the key signals S1 and S2 from the key matrix unit 1 and the remote key signal receiving unit 3 and outputs the external control signals S5, S6 and S18 respectively to the servo system 7, the tape loading control unit 8 and the recording means 19 and a display control signal S13 to the timer functioning control means 11.

On the other hand, the timer functioning control means 11 receives the supply state signal S9, the take-up state signal S10 and the loading state signal S11 from the deck unit 9 and the display control signal S13 from the system control means 10 and outputs the external control signals S3 and S4 respectively to the time display unit 6 and the on-screen display unit 5. Also, the timer functioning control means 11 receives the key signals S1 and S2 from the key matrix unit 1 and the remote key signal receiving unit 3 and outputs the external control signals S3, S4, S12 and S14 respectively to the time display unit 6, the on-screen display unit 5, the system control means 10 and the voice signal generator 12.

The operation of the reserve-recording apparatus with the above-mentioned construction in accordance with the present invention will now be described in detail with reference to FIGS. 6 through 15.

First, a main routine according to the above-mentioned construction will be described briefly with reference to FIG. 6.

Figure 6:
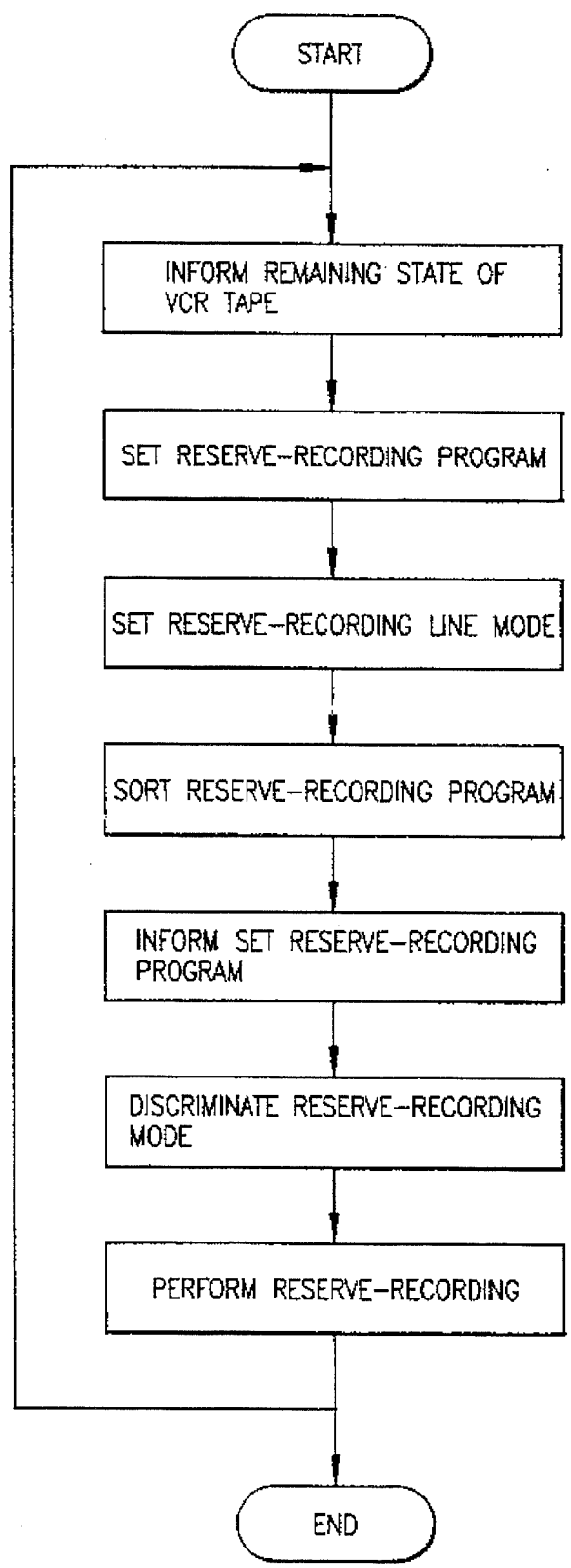
FIG. 6 is a flowchart illustrating the overall operation of the reserve-recording apparatus shown in FIG. 5 in accordance with the present invention.

With reference to FIG. 6, there is shown a flowchart illustrating the overall operation of the reserve-recording apparatus shown in FIG. 5 in accordance with the present invention.

First, if the key signal S1 or S3 for setting of a reserve-recording program is outputted from the key matrix 1 or the remote key signal receiving unit 3 in accordance with the selection of the user and a reserve-recording program setting mode is thus selected, the voice and screen through the on-screen display unit 5 and the voice signal generator 12 inform the user of information corresponding to the recordable remaining amount of the VCR tape.

Then, upon receiving the key signal S1 or S2, corresponding to setting contents of the desired reserve-recording program, from the key matrix 1 or the remote key signal receiving unit 3 in accordance with the selection of the user, the control means 20 stores information corresponding to the setting contents in its internal memory (not shown). Also, the control means 20 sets a reserve-recording mode, in accordance with the key signal S1 or S2 from the key matrix unit 1 or the remote controller 2, according to whether a source of the desired reserve-recording program is which one of the tuner 13, the satellite broadcasting receiving system 14 or the camcorder 15, and then stores the set contents in its internal memory.

The control means 20 then compares the recording start time of the current set reserve-recording program with the recording start times of preset reserve-recording programs, the recording start times being stored in the internal memory. The control means 20 then performs a sorting mode of sorting the reserve-recording programs in their reserve numbers in order of earliness in accordance with the compared result so that the reserve-recording program with the earlier recording start time goes first in a recording order.

Then, when the current time reaches a predetermined time (about five minutes in the preferred embodiment of the present invention) before the recording start time of the reserve-recording program set in order of reserve number, the timer functioning control means 11 in the control means 20 displays through the on-screen display unit 5 the reserve information indicating that the current time is about five minutes before the recording start time of the reserve-recording program. As a result, when the user uses the VCR with forgetting the set reserve-recording program, the release of the reserve-recording of the reserve-recording program can be prevented.

The control means 20 then discriminates whether which one of the reserve-recording modes is set. In other words, the control means 20 discriminates whether a source of the program to be reserve-recorded is which one of the tuner 13 for receiving the television broadcasting, the satellite broadcasting receiving system 14 or the camcorder 15, and then outputs the control signals S15, S16 and S17 to the recording switching circuit 16 in accordance with the discriminated result, thereby allowing the apparatus to form the corresponding components and recording lines.

Then, the recording means 19, for a predetermined period of recording time, records an output signal from the recording switching circuit 16 on the VCR tape loaded into the deck unit 9 in response to the control signal S18 from the control means 20.

Next, the above-mentioned main routine will be described, in part, in detail with reference to FIGS. 7 through 15.

Figure 7:
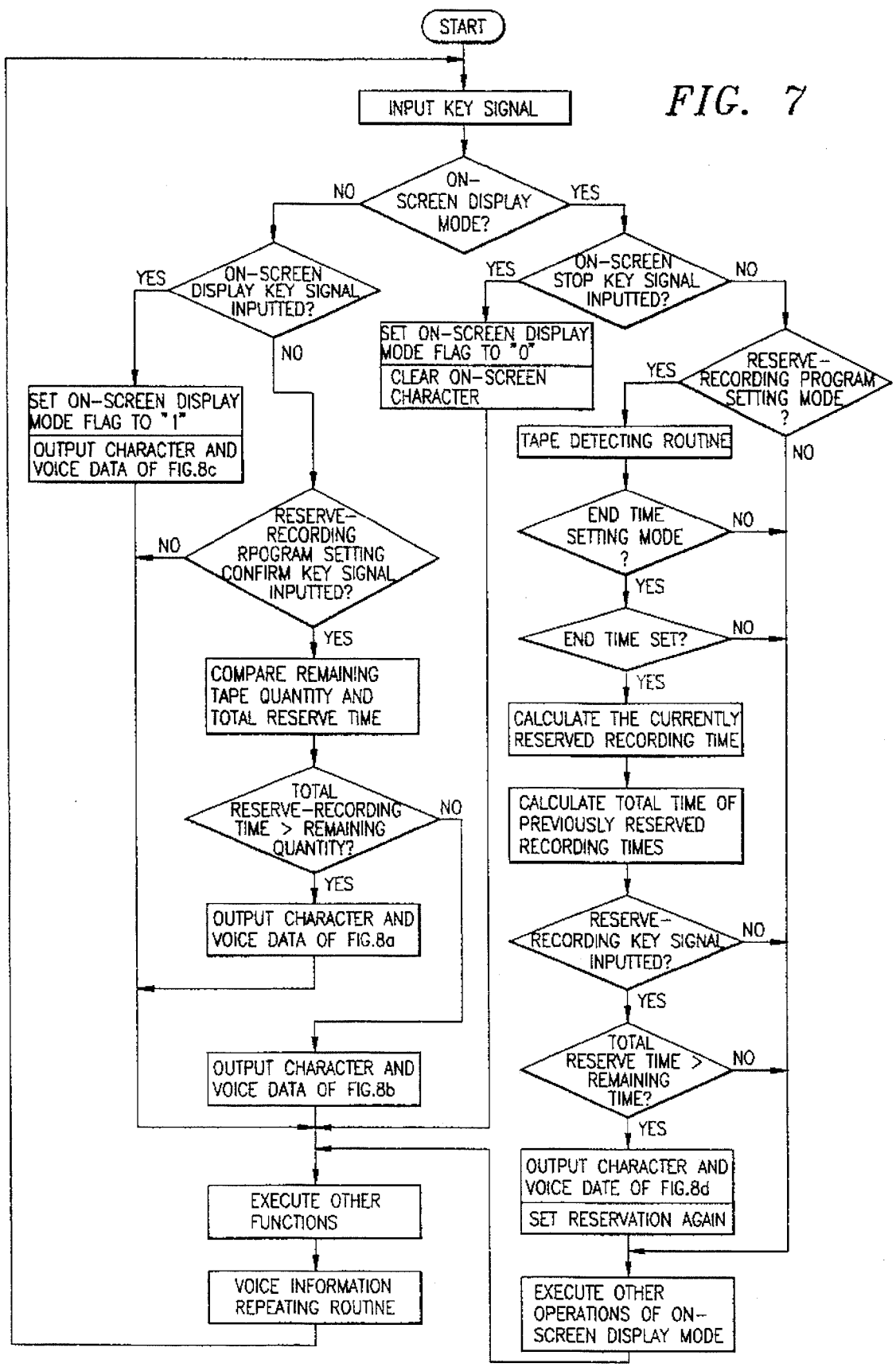
FIG. 7 is a flowchart illustrating a process of setting a reserve-recording program in accordance with the present invention.
Figure 8:
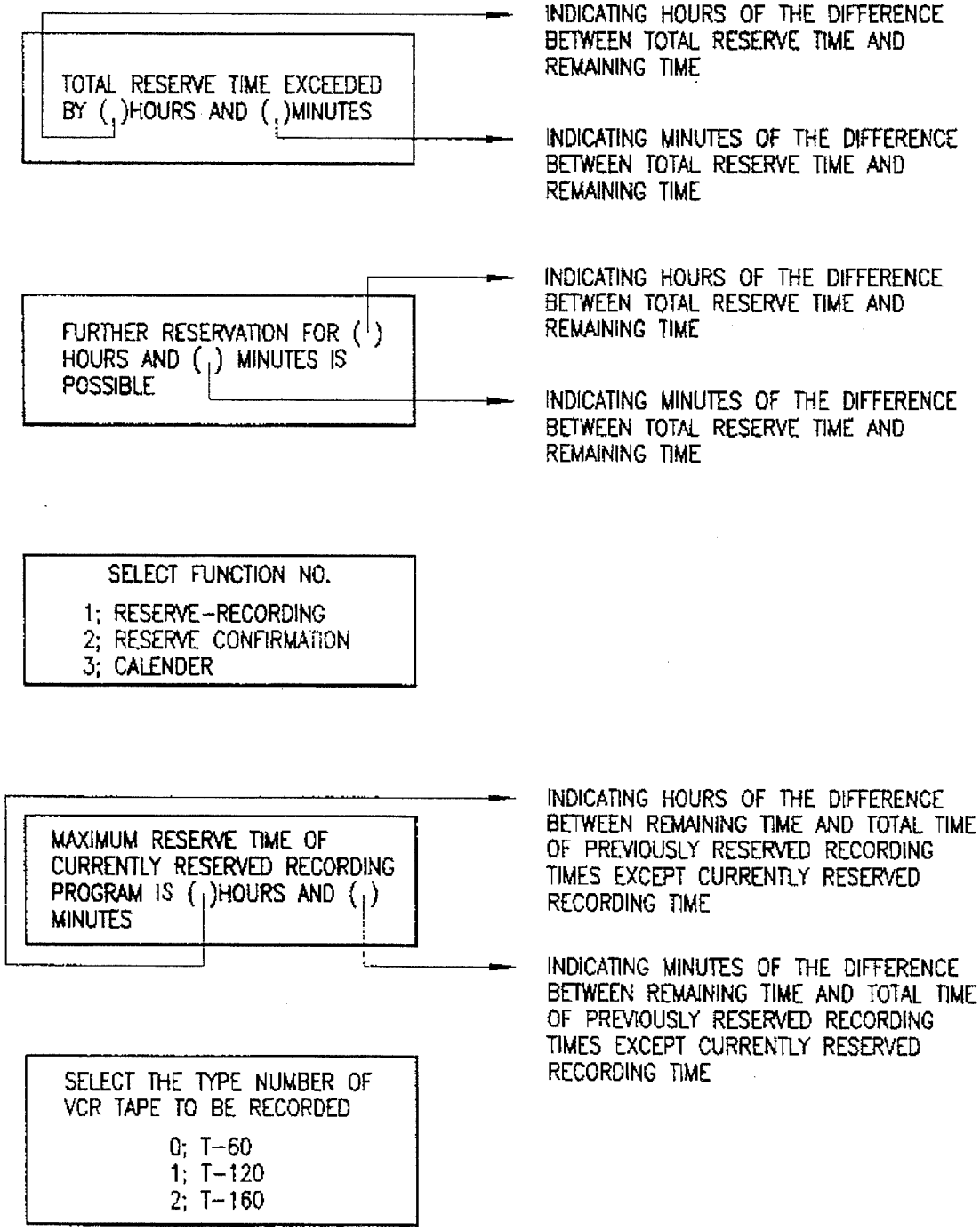
FIG. 8 illustrates on-screen display states in accordance with the present invention.

With reference to FIG. 7, there is shown a flowchart illustrating a process of setting the reserve-recording program in accordance with the present invention.

First, upon receiving the key signal S1 or S2, corresponding to setting contents of the desired reserve-recording program, from the key matrix 1 or the remote key signal receiving unit 3 shown in FIG. 5 in accordance with the selection of the user, the timer functioning control means 11 discriminates the current inputted key contents. If the inputted key signal is not an on-screen display mode signal and an on-screen display designating key signal, but a setting confirming key signal of a pre-reserved recording program, the timer functioning control means 11 calculates the total reserve-recording time of the pre-reserved recording program and the remaining time of the VCR tape on the basis of a standard speed mode (SPM). In accordance with the calculated results, the timing functioning control means 11 informs through the on-screen display unit 5 and the voice signal generator 12 of character data and voice data indicating that "the total reserve-recording time exceeded by ( ) hours and ( ) minutes" and/or "further reservation for ( ) hours and ( ) minutes" is possible, as shown in FIGS. 8a and 8b. If the on-screen display designating key signal has been inputted, the timer functioning control means 11 sets an on-screen display mode flag in an on-screen display register to "1" and then informs through the on-screen display unit 5 and the voice signal generator 12 of character data and voice data indicating that "select function number", as shown in FIG. 8c. The function selected by the user and a voice information repeating routine are then performed. Thereafter, the operation is returned to the initial state of inputting the key signal S1 or S2 from the key matrix 1 or the remote key signal receiving unit 3 and the above process is repeated until detection of the on-screen display mode.

On the other hand, if the on-screen display mode is detected and the detected mode is the reserve-recording program setting mode, there is performed a tape detecting routine of setting a type of the VCR tape and calculating the remaining time of the VCR tape. Then, if the current mode is a reserve end time setting mode and the reserve end time of the current reserved recording program is set, the recording time of the current reserved recording program, the recording times of the pre-reserved recording programs and the total of the recording times of the current and pre-reserved recording programs are calculated on the basis of the standard speed mode (SPM). If the calculated total exceeds the remaining time of the VCR tape, character data and voice data indicating that "the maximum time of the current reserved recording program is ( ) hours and ( ) minutes" as shown in FIG. 8d are informed of through the on-screen display unit 5 and the voice signal generator 12. Therefore, the user can set up again the reserve-recording.

In the on-screen display mode, if no on-screen display stop key signal is inputted and the current mode is not the reserve-recording program setting mode, another operation in the on-screen display mode is performed. On the other hand, if the on-screen display stop key signal is inputted, the on-screen display register is set to "0", the character displayed on the screen is cleared, the other functions and the voice information repeating routine are performed and the operation is then returned to the initial state.

Figure 9:
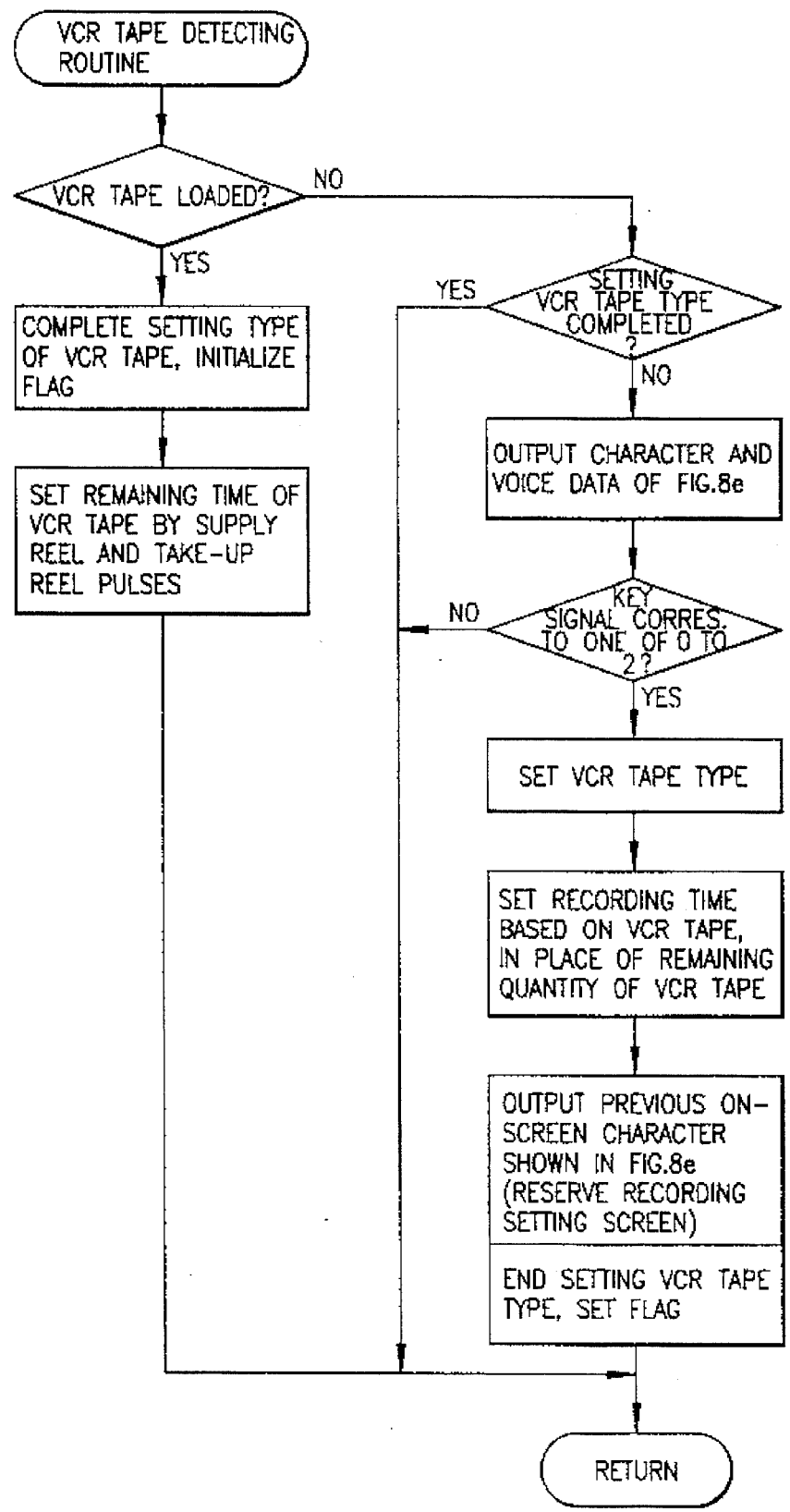
FIG. 9 is a flowchart illustrating a VCR tape detecting routine in accordance with the present invention.

The tape detecting routine of FIG. 7 is executed according to the process illustrated in FIG. 9. First, it is determined whether VCR tape has been loaded. If VCR tape has been loaded, tape selection end flag which is the flag for optionally setting the type of VCR tape when no VCR tape has been loaded is initialized. The remaining time of VCR tape is then set on the basis of the standard speed mode (SSM), according to the rotation time of take-up reel inputted from the deck unit 9. On the other hand, if no VCR tape has been loaded, it is determined whether setting of the type of VCR tape has been completed. When the type of VCR tape has been completely set, the VCR tape detecting routine is ended. However, if setting of the type of VCR tape has not been completed, character data and voice data indicative of "select the type number of VCR tape to be recorded" shown in FIG. 8e are outputted through the on-screen display unit 5 and the voice signal generator 12, respectively. Thereafter, it is determined whether the key signal from the key matrix unit 1 or the remote key signal receiving unit 3 corresponds to one of numbers of 0 to 2. If the key signal is one of 0 to 2, the type of VCR tape is set, in place of the remaining quantity of VCR tape. That is, the reserve-recording time is set to 2 hours at the standard speed mode (SSM) in the case of VCR tape T-120 corresponding to 1, an hour at the standard speed mode (SSM) in the case of VCR tape T-60 corresponding to 0, and 2 hours and 30 minutes at the standard speed mode (SSM) in the case of VCR tape T-160 corresponding to 2. Then, the character "select the type number of VCR tape to be recorded" is cleared. Simultaneously, the screen which was previously displayed is displayed again. After the flag indicative of the completion of selecting VCR tape type is set in corresponding register, the tape detecting routine is ended.

Figure 10:
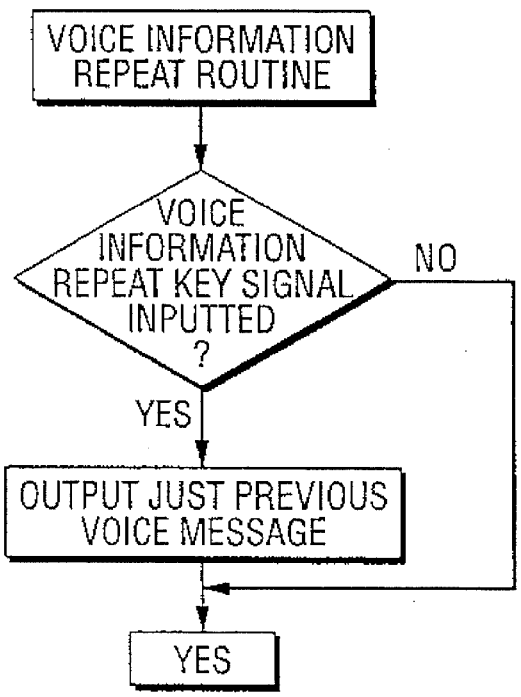
FIG. 10 is a flowchart illustrating a voice information repeating routine in accordance with the present invention.
Figure 11:
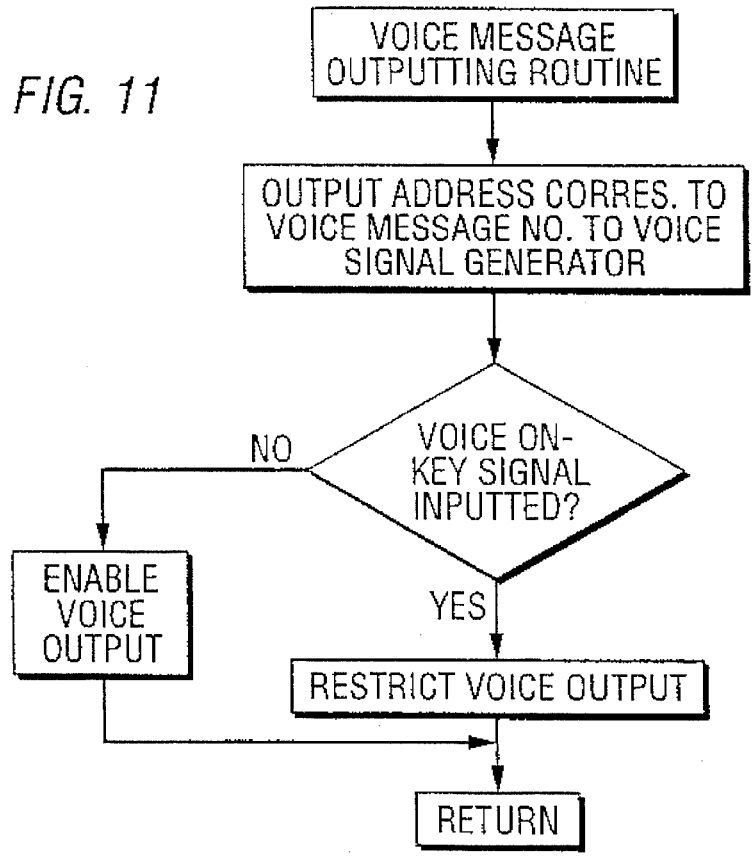
FIG. 11 is a flowchart illustrating a voice message outputting routine in accordance with the present invention.

On the other hand, the voice information repeating routine of FIG. 7 is executed according to the process illustrated in FIGS. 10 and 11. First, it is determined whether a voice information repeating key signal has been inputted from the key matrix unit 1 or the remote key signal receiving unit 3 to the control means 20. If a voice information repeating key signal has been inputted to the control means 20, the voice data which has been outputted just previously is outputted through the voice signal generator 12, so as to transmit voice message to the user. That is, outputting of voice is restricted or enabled, depending on ON/OFF states of the voice output switch (not shown).

The process will now be explained in detail, in conjunction with FIGS. 12a to 12c. In the case of VCR tape T-120, the reserve time of the currently reserved recording program is set to 2 hours, at a maximum, at the standard speed mode (SSM) and 6 hours, at a maximum, at the extended speed mode (ESM), as shown time tables of FIGS. 12a to 12c. This means that setting of reserve-recording program is only possible in cases of program Nos. 1 and 2, but impossible in the case of the program No. 3. For enabling the setting of the program No. 3, the reserve time of program Nos. 1 and 2 should be adjusted.

On the other hand, setting of all reserve-recording program Nos. 1 to 3 is possible in the case of VCR tape T-160, as shown in FIG. 12c. However, any further setting of next reserve-recording program No. 4 and further next ones is impossible.

For providing a convenience in use at this time, if key signals for setting reserve-recording programs have been inputted from the key matrix unit 1 or the remote key signal receiving unit 3 to the control means 20, the reserve-recording time is properly adjusted, depending on the remaining quantity of VCR tape. On the other hand, when no key signal has been inputted to the control means 20, the previous general reserve-recording program setting process is executed. These processes will be explained in detail, in conjunction with FIG. 7. The processes is carried out by the operation of control means 20 having the function of timer, when key signals are inputted to the control means 20 through the key matrix unit 1 or the remote key signal receiving unit 3.

That is, the control means 20 discriminates whether key data S1 or S2 inputted from the key matrix 1 or the remote key signal receiving unit 3 corresponds to the on-screen display mode. If the key data does not correspond to the on-screen display mode, the control means 20 discriminates whether next key signal is the on-screen display designating key signal.

When the next key signal is the on-screen display designating key signal, the on-screen display mode flag in the register for on-screen display mode is set to "1". On the on-screen display unit 5, character data is then displayed which is indicative of "select function No.", "1: reserve-recording", "2: reserve confirmation" and "3: calendar" as shown in FIG. 8c.

On the other hand, if the key signal is not the on-screen designating key signal, but the key signal for confirming the setting of reserve-recording programs, the total reserve time of reserve-recording programs is calculated on the basis of the standard speed mode (SSM). Thereafter, the remaining quantity of VCR tape is calculated on the basis of the standard speed mode (SSM) and compared with the calculated total reserve time of the previously reserved recording programs.

At this time, if the total reserve time exceeds the remaining time of VCR tape (total reserve time>remaining time of VCR tape), the remaining time is subtracted from the total reserve time to calculate the exceeding quantity in terms of hour and minute. Thereafter, this exceeding quantity is informed to the user, by outputting character data and voice data indicative of "total reserve time exceeded by ( ) hours and ( ) minutes" through the on-screen display unit 5 and the voice signal generator 12.

When the remaining time is identical to or more than the total reserve time (total reserve time≦remaining time of VCR tape), the total reserve time is subtracted from the remaining time to calculate the further reserve quantity in terms of hour and minute. Thereafter, this additional reserve quantity is informed to the user, by outputting character data and voice data indicative of "further reservation for ( ) hours and ( ) minutes is possible" through the on-screen display unit 5 and the voice signal generator 12, as shown in FIG. 8*b*.

On the other hand, if the initially inputted key signal is indicative of on-screen mode, the control means 20 discriminates again whether it is the on-screen display stop key signal. When the key signal is the on-screen display key signal, the on-screen display mode flag in the register for on-screen display mode is set to "1". Then, the on-screen characters are cleared. If no key signal for designating on-screen display has been inputted, the control means 20 discriminates again whether the key signal is indicative of reserve-recording program setting mode. If not the reserve-recording program setting mode, other operations of the on-screen display mode are performed. In the case of the reserve-recording program setting mode, the VCR tape detecting routine is executed as shown in FIG. 9.

That is, if VCR tape has been loaded, tape selection end flag which is the flag for optionally setting the type of VCR tape when no VCR tape has been loaded is initialized. The remaining time of VCR tape is then set on the basis of the standard speed mode (SSM), according to supply reel and take-up reel pulses inputted from the deck unit 9.

On the other hand, if no VCR tape has been loaded, it is determined whether the tape setting end flag has been set to "1" indicative of the setting of the type of VCR tape has been completed previously. When the tape setting end flag has been set to "1", the VCR tape detecting routine is ended. However, if the tape setting end flag has not been set to "1", character data and voice data indicative of "select the type number of VCR tape to be recorded" shown in FIG. 8*e* are outputted through the on-screen display unit 5 and the voice signal generator 12, respectively, so as to inform the user of character and voice message of "select the type number of VCR tape to be recorded".

Thereafter, it is determined whether the key signal from the key matrix unit 1 or the remote key signal receiving unit 3 corresponds to one of numbers of 0 to 2. If the key signal is one of 0 to 2, the type of VCR tape is set, in place of the remaining quantity of VCR tape. That is, the reserve-recording time is set to 2 hours at the standard speed mode (SSM) in the case of VCR tape T-120 corresponding to 1, an hour at the standard speed mode (SSM) in the case of VCR tape T-60 corresponding to 0, and 2 hours and 30 minutes at the standard speed mode (SSM) in the case of VCR tape T-160 corresponding to 2. Then, the character displayed on the screen as shown in FIG. 8*e* is cleared. Simultaneously, the screen which was previously displayed is displayed again. The VCR tape setting end flag is set to "1".

After the execution of tape detecting routine, the control means 20 discriminates again whether the reserve-recording program end time setting mode has been designated. In the case of the reserve-recording program end time setting mode, it is determined whether the reserve-recording time of reserve-recording program has been set. If the reserve-recording time of reserve-recording program has been set, the recording time required in the currently reserved recording program is calculated. The total time of recording times required in reserve-recording programs other than the currently reserved recording program is calculated on the basis of the standard speed mode (SSM).

Subsequently, The total time of the recording time of currently reserved recording program and previously reserved recording programs is calculated and then compared with the remaining time of VCR tape (if no tape has been loaded, the time based on the set type of VCR tape). At this time, if this total reserve time exceeds the remaining time of VCR tape (total reserve time>remaining time of VCR tape), the previous total time of recording times required in previously reserved recording programs time except the recording time of currently reserved recording program is subtracted from the remaining time to calculate the difference in terms of hour and minute. Thereafter, this difference is informed to the user, by outputting character data and voice data indicative of "maximum reserve time of currently reserved recording program is ( ) hours and ( ) minutes", as shown in FIG. 8*d*, through the on-screen display unit 5 and the voice signal generator 12.

After the execution of the above process, the voice information repeating routine is executed. That is, when key signal for performing the voice information repeating has been inputted to the control means 20, the just previously outputted voice message is outputted repeatedly.

Outputting of voice message is possible only when voice outputting key signal has been inputted under the condition that address signal corresponding to the voice message number has been outputted. If no voice outputting key signal has been inputted, outputting of voice message is restricted. Thereafter, the operation returns to the initialization state.

As apparent from the above description, reserve-recording can be set depending on the remaining quantity of VCR tape, according to the reserve-recording program setting operation of the present invention. As voice information for reserve-recording setting operation is outputted, together with on-screen information, the user can more easily confirm the current remaining state of VCR tape, in setting reserve-recording programs. It is also possible to eliminate the disadvantage of useless setting of reserve-recording time which is encountered when the remaining quantity of VCR tape is less than the reserve-recording time. Since the remaining quantity of VCR tape is more easily checked, by virtue of voice warning, the setting of reserve-recording program can be efficiently accomplished.

Figure 13:
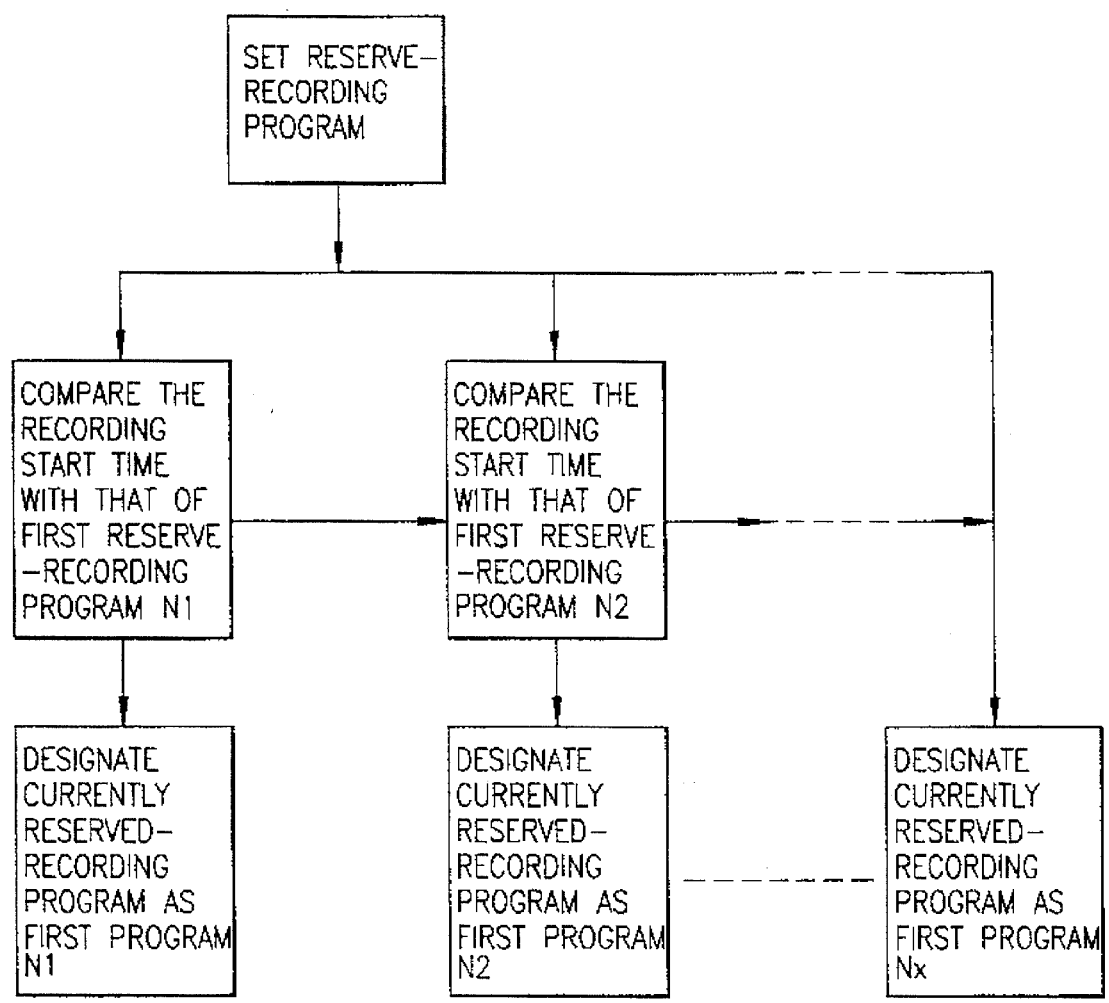
FIG. 13 is a flowchart illustrating simply a process of sorting the reserve-recording programs in accordance with the present invention.
Figure 14:
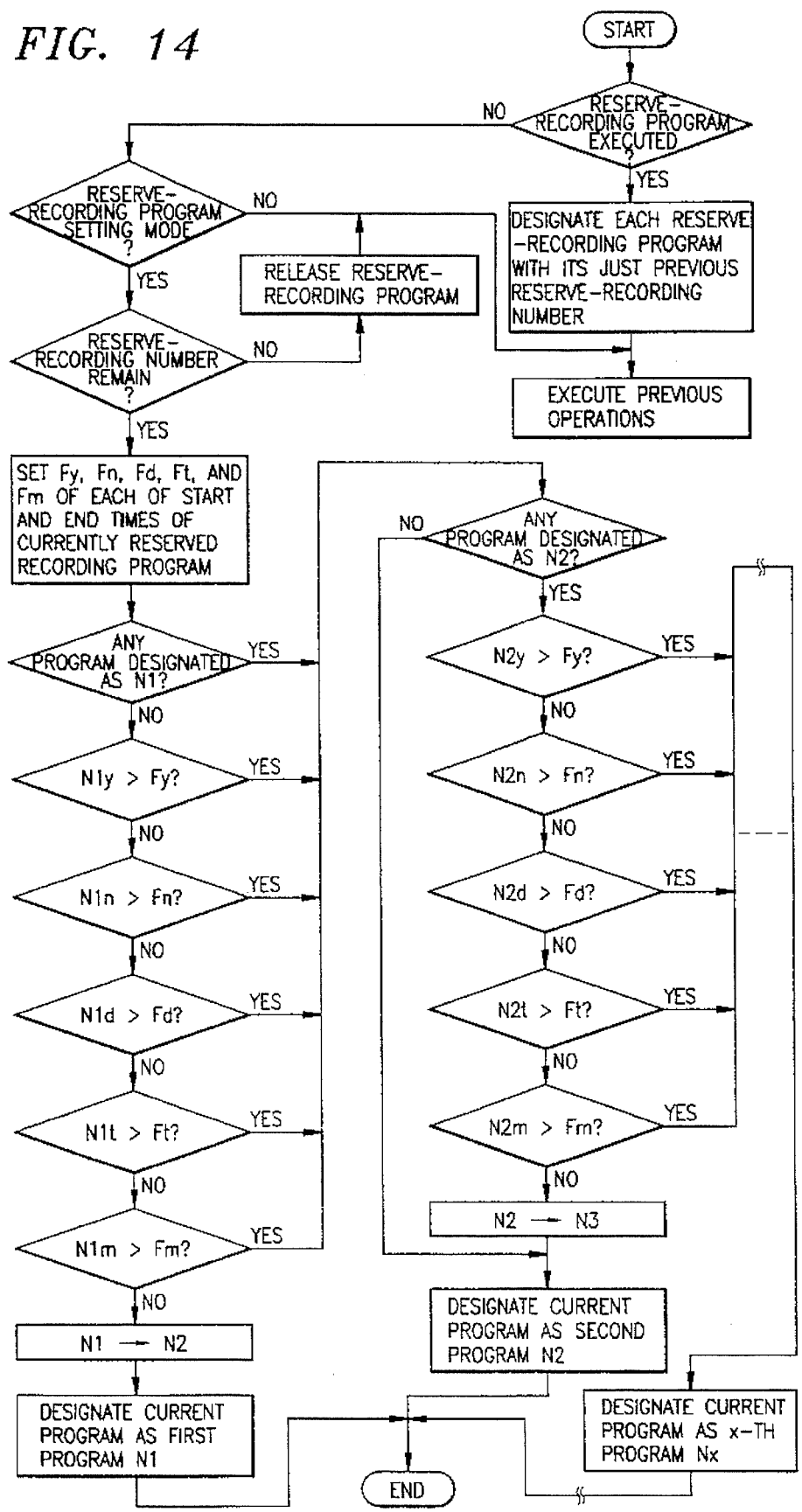
FIG. 14 is a flowchart illustrating in detail the process of sorting the reserve-recording programs in accordance with the present invention.

On the other hand, the process for sorting the set reserve-recording programs in the order of recording start time will now be described, in conjunction with FIGS. 13 and 14.

First, the case where a plurality of previously reserved programs have been set will be explained. When reserve-recording of the first reserve-recording program N1 with the earliest recording start time has been performed, the second reserve-recording program N2, the third reserve-recording program N3, the fourth reserve-recording program N4 . . . , and the final reserve-recording program Nx are designated and stored as a new first reserve-recording program N1, a new second reserve-recording program N2, a new third reserve-recording program N3 . . . , and a new just prior to final reserve-recording program Nx−1, respectively. Thus, as the reserve-recording programs are reserve-recorded one by one in the order of recording start time, the remaining reserve-recording programs which are not reserve-recorded yet are designated and stored as new reserve-recording programs numbered with their just previous numbers, respectively.

However, when no reserve-recording program has been reserve-recorded, the control means 20 discriminates whether the reserve-recording program setting mode has been designated, that is whether the user wishes to reserve-record a new program. If the reserve-recording program setting mode has been designated, the control means 20 discriminates whether any reserve-recording number which can be designated for the new reserve-recording program has remained in the previously reserved recording programs. If a reserve-recording number which can be designated for the new reserve-recording program has remained, year Fy, month Fn, day Fd, hour Ft and minute Fm of each of start and end times of the reserve-recording program is stored, according to the manipulation of the key matrix unit 1 or the remote controller 2 by the user.

If the designation of remaining reserve-recording number for the new reserve-recording program has been completed or if no reserve-recording program setting mode has been designated, the process proceeds to the step for performing previous operations. When a reserve-recording number which can be designated for the new reserve-recording program has not remained, the process proceeds to the step for performing previous operations, after the release of the reserve-recording program setting mode.

On the other hand, when start and end times of the new reserve-recording program have been set, the control means 20 discriminates whether any reserve-recording program has been previously designated as the first reserve-recording program N1. If any reserve-recording program has not been previously designated as the first reserve-recording program N1, that is if there is no reserve-recording program previously designated, the currently reserved recording program is regarded as the initially reserved recording program and designated as the first reserve-recording program N1. However, when a reserve-recording program has been previously designated as the first reserve-recording program N1, year F1y, month F1n, day F1d, hour F1t and minute F1m of the start time of the reserve-recording program are compared with year Fy, month Fn, day Fd, hour Ft and minute Fm of the start time of the currently reserved recording program, respectively. If the start time of the currently reserved recording program is earlier than that of the first reserve-recording program N1, the first reserve-recording program N1, the second reserve-recording program N2, the third reserve-recording program N3, . . . , and the just prior to final reserve-recording program Nx–1 are designated and stored as a new second reserve-recording program N2, a new third reserve-recording program N3, a new fourth reserve-recording program N4, . . . , and a new final reserve-recording program Nx, respectively. However, when the start time of the currently reserved recording program is later than that of the first reserve recording program N1, the control means 20 discriminates whether any reserve-recording program has been previously designated as the second reserve-recording program N2. If any reserve-recording program has not been previously designated as the second reserve-recording program N2, the currently reserved recording program is designated as the first reserve-recording program N1. However, when a reserve-recording program has been previously designated as the second reserve-recording program N2, year F2y, month F2n, day F2d, hour F2t and minute F2m of the start time of the reserve-recording program are compared with year Fy, month Fn, day Fd, hour Ft and minute Fm of the start time of the currently reserved recording program, respectively. If the start time of the currently reserved recording program is earlier than that of the second reserve recording program N2, the second reserve-recording program N2, the third reserve-recording program N3, . . . , and the just prior to final reserve-recording program Nx–1 are designated and stored as a new third reserve-recording program N3, a new fourth reserve-recording program N4, . . . , and a new final reserve-recording program Nx, respectively. However, when the start time of the currently reserved recording program is later than that of the second reserve-recording program N2, the same process which has been executed with respect to the above first and second reserve-recording programs N1 and N2 is repeated for the third reserve-recording program N3, so as to perform the comparison of the recording start time with respect to the third reserve-recording program N3. This process will be repeatedly continued until the start time of the currently reserved recording program is earlier than that of the n-th reserve-recording program Nn (n is an optional number between 1 and x). If the start time of the currently reserved recording program is earlier than that of the n-th reserve-recording program Nn, the currently reserved recording program is designated as a new n-th reserve-recording program Nn. Simultaneously, the previous n-th reserve-recording program Nn and following reserve-recording programs are newly designated with new numbers each being later than its previous number by one.

As stated above, sorting the reserve-recording programs in their reserve numbers in order of earliness so that the reserve-recording program with the earlier recording start time goes first in the recording order provides advantages as follows:

It saves the user the trouble of sorting the numbers of the reserve-recording programs in order of the recording start time in every case, resulting in convenience in use of the system. Also, the reserve-recording programs can obviously be confirmed in accordance with the recording start times. Therefore, the reserve-recording of the programs can be performed efficiently.

Then, a reserve-recording mode setting and discriminating process will be described with reference to FIG. 5.

First, if one of recording line modes from a plurality of external equipments is selected by the key matrix unit 1, the timer functioning control means 11 inputs a predetermined recording the mode select signal corresponding to the selected recording line mode. Also, the recording time and broadcasting channel of the reserve-recording program are selected by the system control means 10 and the key matrix unit 1.

Upon receiving the recording line mode select signal from the key matrix unit 1, the timer functioning control means 11 in the control means 20 detects the current time. Then, if the current time is in accord with the recording start time of the reserve-recording program, the timer functioning control means 11 in the control means 20 outputs to the recording switching circuit 16 the desired control signals S15, S16 and S17 corresponding to the recording line mode selected in accordance with the recording line mode select signal from the key matrix unit 1.

For example, if the recording line mode is a television broadcasting mode, the timer functioning control means 11 in the control means 20 outputs a low level signal at its output terminal i and high level signals at its output terminals j and k.

Also, if the recording line mode is a camcorder mode, the timer functioning control means 11 in the control means 20 outputs a low level signal at its output terminal k and high level signals at its output terminals i and j.

Upon receiving the control signals outputted from the timer functioning control means 11, the recording switching circuit 16 selects one of the tuner 13, the satellite broadcasting receiving system 14 and the camcorder 15 in accordance with one of the control signals corresponding to the recording line modes, resulting in forming of the recording line to the system.

If the recording line mode is the television broadcasting mode, the recording switching circuit 16 operates to receive the broadcasting program on a reserved channel from the tuner 13 contained in the VCR and supply the received broadcasting program to the recording means 19. Also, if the recording line mode is the satellite broadcasting mode, the recording switching circuit 16 operates to receive the output signal from the satellite broadcasting receiving system and supply the received signal to the recording means 19. On the other hand, if the recording line mode is the camcorder mode, the recording switching circuit 16 operates to receive the output signal from the camcorder 15 and supply the received signal to the recording means 19.

The recording means 19 records the signal supplied from the recording switching circuit 16 on the VCR tape and completes the recording of the reserve-recording program, under the control of the control means 20, when the current time reaches the recording end time of the reserve-recording program.

As stated above, in addition to the tuner, the reserve-recording of the VCR can be applied to the satellite broadcasting receiving system or the camcorder.

Then, a process of performing the reserve-recording of the reserve-recording program will be described with reference to FIG. 15.

Figure 15:
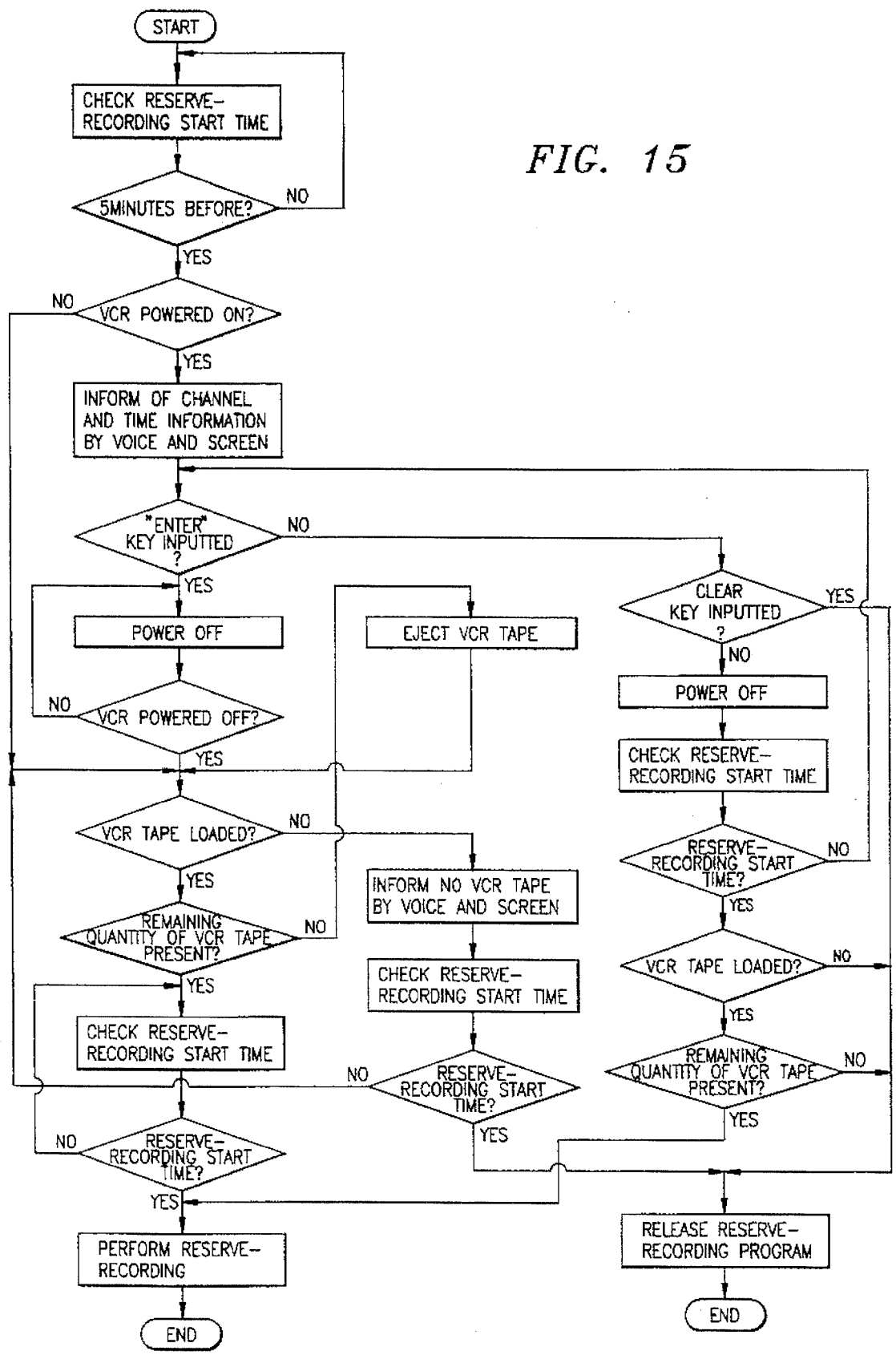
FIG. 15 is a flowchart illustrating a process of performing the reserve-recording of the reserve-recording program in accordance with the present invention.

With reference to FIG. 15, there is shown a flowchart illustrating a process of performing the reserve-recording of the reserve-recording program in accordance with the present invention.

First, if the reserve-recording program is set by the user, the control means 20 continuously checks the recording start time of the set reserve-recording program. The control means 20 then discriminates the power-on/off states of the VCR when the current time reaches a predetermined time (five minutes herein) before the recording start time of the reserve-recording program in accordance with the checked result. If the power-off state of the VCR is discriminated, the control means 20 discriminates whether the VCR tape has been loaded. If the VCR tape has been loaded, the control means 20 checks the recordable remaining quantity of the VCR tape. If the recordable remaining quantity of the VCR tape is present, the reserve-recording is performed when the current time reaches the recording start time of the reserve-recording program. On the other hand, if no recordable remaining quantity of the VCR tape is present, the VCR tape is ejected and the user is induced to insert another VCR tape.

If no VCR tape is present, there is performed an alarm display operation of flickering a tape display lamp through the time display unit 6 in a conventional manner, so that the user is induced to insert the VCR tape.

In a case where the VCR is powered on by the user for use of the VCR in the middle of the reserve-recording of the set reserve-recording program, the control means 20 displays information regarding the reserve-recording through the on-screen display unit 5. That is, the channel number, the recording start time and the recording end time of the reserve-recording program are displayed on the screen of the television set or the monitor. At this time, it is selected by the user whether the reserve-recording of the set reserve-recording program will be performed continuously. As a result, when the reserve-recording is selected, an enter key is pushed; when the reserve-recording is canceled, a clear key is pushed.

The control means 20 displays on the screen through the on-screen display unit 5 a message indicative of selection of the enter key or the clear key. As a result, if the user pushes the enter key for selection of the reserve-recording, the system inserts the VCR tape and displays on the screen through the on-screen display unit 5 a message indicative of maintaining of the power-off state of the VCR. Then, when the VCR is powered off, there is performed the process of discriminating the loading statue of the VCR tape. On the other hand, if the user pushes the clear key for cancellation of the reserve-recording of the set reserve-recording program, the reserve-recording of the set reserve-recording program is released. If no enter key signal and clear key signal have been inputted upon powering-on of the VCR, there is checked the recording start time of the reserve-recording program. The operation stands by until the recording start time. Then, when he current time is in accord with the recording start time, the VCR is powered off and it is discriminated whether VCR tape has been loaded. As a result, the reserve-recording of the reserve-recording program is performed only when the VCR tape has been loaded.

In other words, the control means 20 checks continuously the recording start time and discriminates power-on/off states of the VCR when the current time is in accord with a predetermined time (five minutes) before the reserve-recording start time. If the VCR is powered off, it is discriminated whether VCR tape has been loaded and the reserve-recording is performed only when the VCR tape has been loaded. On the other hand, if the VCR is powered on, reserve information corresponding to the set reserve-recording program is displayed on the screen, so that the user selects or cancels the set reserve-recording program. When the user goes out during the powering-on of the VCR or when no further command signal is present, the control means 20 automatically powers off the VCR when the current time is in accord with the recording start time, discriminates whether VCR tape has been loaded and then performs the reserve-recording operation only when the VCR tape has been loaded.

As hereinbefore described, in accordance with the present invention, if the user uses the VCR or powers on the VCR with forgetting the reserve-recording time through his or her carelessness, the reserve information corresponding to the set reserve-recording program is displayed on the screen when the current time reaches a predetermined time before the reserve-recording start time, for the purpose of the user's recognition of the information, so that the reserve-recording can be performed in time. Also, if the VCR is powered on when nobody is present, the reserve-recording can automatically be performed at the set reserve-recording time, so that the reserve-recording can accurately be performed.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A method of reserve-recording a desired program on a videotape in a VCR, said VCR having a plurality of recording speed modes, a voice signal generator, and an on-screen display, and said video tape having a known recordable capacity for each of said recording speed modes, comprising the steps of:

(a) indicating a state of the recordable capacity of said video tape through said voice signal generator and said on-screen display in response to an inputted first key signal designating a reserve-recording program setting mode;

(b) setting reserve-recording information for a recording reservation for the desired program in response to an inputted second key signal, said recording reservation including a start time for recording of the desired program;

(c) setting a reserve-recording mode by determining a source of said desired program in response to an inputted third key signal, said source being one of a plurality of external devices, said external devices including a television tuner and a satellite broadcast receiving system;

(d) comparing said start time for recording of the desired program with a recording start time of each of a group of previously reserved programs having reserve-recording information, and sorting said recording reservation and said previously reserved programs in chronological progression according to said start times to form a new group of reserved programs each having a number, said new group having at least an earliest program such that said earliest program has the lowest number and is recorded first;

(e) automatically displaying said reserve-recording information of said desired programs through the on-screen display at a predetermined time prior to the start time of the recording reservation of the desired program if the VCR is in use and requesting an input from a user to determine whether the recording reservation should be performed;

(f) if an input is received from the user indicating the recording reservation should not be performed, cancelling the recording reservation, and if an input is received from the user indicating the recording reservation should be performed, or if no input is received from the user, determining the reserve-recording mode, forming a recording line between the VCR and the source, and recording the desired program at the start time of the recording reservation of the desired program.

2. The method of claim 1, wherein said state of the recordable capacity comprises the reserve-recording information of said previously reserved programs, an amount of time by which said desired program exceeds the remaining recordable capacity of the video tape, and an amount of time representing the remaining recordable capacity of the tape.

3. The method of claim 1, wherein the step of indicating the state of the recordable capacity of the video tape through the voice signal generator occurs only in response to a fourth inputted key signal.

4. A reserve-recording apparatus for a VCR, comprising:

control means for providing a plurality of control signals in response to a plurality of inputted key signals;

key signal input means for providing said control means with said key signals in response to a group of commands by a user;

on-screen display means for automatically displaying reserve-recording information on a screen at a predetermined time prior to a start time of a program to be recorded when the VCR is in use and for requesting an input from a user to determine whether recording of the program should be performed, wherein said on-screen display means is controlled by said control means, and wherein if an input is received from the user indicating the recording should not be performed, said control means cancels the recording, and if an input is received from the user indicating the recording should be performed, or if no input from the user is received, said control means proceeds with recording;

time display means for displaying a traveling state of a video tape, wherein said time display means is controlled by said control means;

voice generating means for outputting a voice message corresponding to said reserve-recording information, wherein said voice generating means is controlled by said control means;

video tape state detecting means for detecting the traveling state of said video tape and providing said control means with a plurality of signals representing the detected state;

recording switching means for forming a recording line between the apparatus and one of a plurality of external devices, said plurality of external devices including a tuner for receiving a television broadcast and a satellite broadcast receiving system, wherein said recording switching means is controlled by said control means; and recording means for recording an output signal from said recording switching means on said video tape.

* * * * *

UNITED STATES PATENT AND TRADEMARK OFFICE
CERTIFICATE OF CORRECTION

PATENT NO. : 5,543,933
DATED : August 6, 1996
INVENTOR(S) : Yong S. Kang et al.

It is certified that error appears in the above-indentified patent and that said Letters Patent is hereby corrected as shown below:

Cover page, section [73] replace "Gold Star C." with --Gold Star Co.--.

Signed and Sealed this

Fourth Day of February, 1997

Attest:

BRUCE LEHMAN

Attesting Officer         Commissioner of Patents and Trademarks